(12) United States Patent
Zhu (10) Patent No.: US 11,506,367 B1
(45) Date of Patent: Nov. 22, 2022

(54) CLAMPING STRUCTURE AND LIGHT DEVICE WITH SAME

(71) Applicant: APUTURE IMAGING INDUSTRIES CO., LTD., Guangdong (CN)

(72) Inventor: Guodong Zhu, Guangdong (CN)

(73) Assignee: APUTURE IMAGING INDUSTRIES CO., LTD., Shenzhen (CN)

(*) Notice: Subject to any disclaimer, the term of this patent is extended or adjusted under 35 U.S.C. 154(b) by 0 days.

(21) Appl. No.: 17/531,689

(22) Filed: Nov. 19, 2021

(30) Foreign Application Priority Data

Jul. 8, 2021 (CN) .......................... 202121551838.1

(51) Int. Cl.
 *F21V 21/088* (2006.01)
 *F21V 21/40* (2006.01)
 *F21V 23/02* (2006.01)
 *F21V 17/16* (2006.01)
 *F21V 17/14* (2006.01)

(52) U.S. Cl.
 CPC ........ *F21V 21/0885* (2013.01); *F21V 21/406* (2013.01); *F21V 23/023* (2013.01); *F21V 17/14* (2013.01); *F21V 17/162* (2013.01)

(58) Field of Classification Search
 CPC ........ F21V 17/18; F21V 17/06; F21V 17/104; F21V 17/108; F21V 17/162; F21V 17/166; F21V 17/164; F21V 17/14; F21V 17/12; F21V 17/10; F21V 17/005; F21V 17/002; F21V 19/004; F21V 19/0045; F21V 21/406; F21V 21/40; F21V 21/08; F21V 21/088; F21V 21/0885
 See application file for complete search history.

(56) References Cited

U.S. PATENT DOCUMENTS

| | | | | |
|---|---|---|---|---|
| 3,832,075 | A * | 8/1974 | Arai | F21V 5/048 403/14 |
| 4,982,313 | A * | 1/1991 | Lupien | F21V 17/14 362/439 |
| 5,465,196 | A * | 11/1995 | Hasenberg | F21V 23/06 362/396 |
| 5,521,595 | A * | 5/1996 | Totten | F21S 9/02 362/186 |
| 5,746,615 | A * | 5/1998 | Ichikawa | F21V 19/0095 439/227 |
| 5,975,719 | A * | 11/1999 | Reiff | F21V 17/14 362/399 |
| 6,293,684 | B1 * | 9/2001 | Riblett | F21L 4/02 362/267 |

(Continued)

*Primary Examiner* — Peggy A Neils
*Assistant Examiner* — James M Endo (57) ABSTRACT

The present invention relates to the technical field of lighting, and particularly discloses a clamping structure and a light device with the same. The clamping structure includes a male seat, an elastic limiting component, a female seat and a pushing aid, the male seat is provided with clamping protrusions, the elastic limiting component is disposed on the male seat, the female seat is provided with clamping slots, one of the clamping slots is internally provided with a limiting slot, the female seat is further provided with a first through hole penetrating to the limiting slot, the pushing aid movably penetrates through the first through hole, and the pushing aid is configured to make the elastic limiting component clamped into or separated from the limiting slot.

10 Claims, 4 Drawing Sheets

(56) References Cited

U.S. PATENT DOCUMENTS

| | | | | |
|---|---|---|---|---|
| 7,641,517 B2* | 1/2010 | Vogt | ................... | H01R 33/0836 |
| | | | | 362/651 |
| 2005/0174765 A1* | 8/2005 | Dorleijn | ................ | H01R 33/46 |
| | | | | 362/217.17 |
| 2006/0120090 A1* | 6/2006 | Wikle | ................... | F21V 21/406 |
| | | | | 362/651 |
| 2011/0176318 A1* | 7/2011 | Yu | ............................ | F21S 8/06 |
| | | | | 362/382 |
| 2015/0078013 A1* | 3/2015 | Vogt | ................... | F21V 19/0045 |
| | | | | 362/373 |
| 2016/0334081 A1* | 11/2016 | Peng | ....................... | F21V 15/01 |
| 2017/0368677 A1* | 12/2017 | Rotenberg | .............. | F21V 21/08 |

* cited by examiner

CLAMPING STRUCTURE AND LIGHT DEVICE WITH SAME

CROSS REFERENCE TO RELATED APPLICATIONS

The present application claims the benefit of Chinese Patent Application No. 202121551838.1 filed on Jul. 8, 2021, the contents of which are incorporated herein by reference in their entirety.

FIELD OF THE INVENTION

The invention relates to the technical field of lighting, in particular to a clamping structure and a light device with the same.

BACKGROUND OF THE INVENTION

In scenes such as photographing, video shooting or movie and television dramas filming, additional light devices are often required to supplement lighting, and the light devices generally have panel lamps, spot lamps, lamp strips, lamp rods, etc. Components of existing light devices are mainly detachably connected by means of threaded connections, but threads are prone to wear during long-term use, resulting in the problems of poor connection, etc. On the other hand, due to the difference in the quantity of respective thread spirals, it is often easy to cause the uncertainty of the orientation of a light emitting surface of a lamp body, operation keys or a display screen after the threaded connections and fixing (that is, the relative angle after fixing is not easy to determine).

SUMMARY OF INVENTION

In order to overcome at least one of the above-mentioned defects in the prior art, the present invention provides a clamping structure and a light device with the same, so as to solve the problems of poor connection and inaccurate alignment caused by the prone wear of existing threaded connection.

The technical solution adopted by the present invention to solve the problems is:

In a first aspect, an embodiment of the present invention discloses a clamping structure, applied to detachable connection of a light device, and including:

a male seat, provided with clamping protrusions;

an elastic limiting component, disposed on the male seat;

a female seat, provided with clamping slots in clamping fit with the clamping protrusions, wherein one of the clamping slots is internally provided with a limiting slot, and the female seat is further provided with a first through hole penetrating to the limiting slot; and a pushing aid, movably penetrating through the first through hole; and the pushing aid is configured to make the elastic limiting component clamped into or separated from the limiting slot.

As an optional implementation, in the embodiment of the first aspect of the present invention, the male seat is internally provided with a threaded stud, the male seat is provided with a second through hole, the elastic limiting component includes an ejector pin and a first elastic member, the ejector pin movably penetrates through the second through hole, one end of the first elastic member abuts against the threaded stud, and the other end of the first elastic member abuts against a side, away from the pushing aid, of the ejector pin.

As an optional implementation, in the embodiment of the first aspect of the present invention, an inlet of one of the clamping slots is provided with a bevel, and when the elastic limiting component moves relative to the female seat, the elastic limiting component is extruded or reset under the action of the bevel.

As an optional implementation, in the embodiment of the first aspect of the present invention, the pushing aid includes an elastic part and an ejector pin part connected to the elastic part, the elastic part is fixed into the limiting slot, the ejector pin part penetrates through the first through hole and is capable of expanding and contracting relative to the first through hole.

As an optional implementation, in the embodiment of the first aspect of the present invention, the pushing aid is a push button, the push button is slidably disposed at the first through hole, and a side, facing the elastic limiting component, of the push button is provided with a guide surface.

As an optional implementation, in the embodiment of the first aspect of the present invention, the male seat and/or the female seat are/is further provided with a second elastic member, and the second elastic member is located between the male seat and the female seat, and configured to eliminate an axial gap between the male seat and the female seat.

As an optional implementation, in the embodiment of the first aspect of the present invention, the male seat and/or the female seat are/is further provided with bosses, and a height of a highest point of each boss is lower than a height of a highest point of the second elastic member.

In a second aspect, an embodiment of the present invention discloses a light device, including a lamp body, a battery, and the clamping structure as mentioned above, wherein the battery is detachably connected to the lamp body through the clamping structure.

In a third aspect, an embodiment of the present invention discloses a light device, including a lamp body, a handle, a battery, and the clamping structure as mentioned above, wherein the handle is detachably connected to the lamp body through the clamping structure, and the battery is disposed on the lamp body.

In a fourth aspect, an embodiment of the present invention discloses a light device, including a lamp body, a handle, a battery, and the clamping structure as mentioned above, wherein the handle is detachably connected to the lamp body through the clamping structure, and the battery is disposed on the handle.

In summary, the clamping structure and the light device with the same provided by the present invention have the following technical effects:

The embodiments of the present invention provide the clamping structure and the light device with the same. The clamping structure includes the male seat, the elastic limiting component, the female seat and the pushing aid, the male seat is provided with the clamping protrusions, the elastic limiting component is disposed on the male seat, the female seat is provided with the clamping slots in clamping fit with the clamping protrusions, one of the clamping slots is internally provided with the limiting slot, the female seat is further provided with the first through hole penetrating to the limiting slot, the pushing aid movably penetrates through the first through hole, and the pushing aid is configured to make the elastic limiting component clamped into or separated from the limiting slot. The clamping structure of this solution is applied to the detachable connection of the light device, and the male seat and the female seat are respectively disposed on two detachably connected components of the light device. During butt joint operation, the male seat is screwed into the female seat at a specific angle, the clamping protrusions are rotated and buckled to the clamping slots, and the pushing aid moves relative to the first through hole under extrusion of the elastic limiting component so that the elastic limiting component may be clamped into the limiting slot for limiting, thereby completing installation limiting, namely, completing connection between the two components of the light device. During disassembly operation, external force is applied to the pushing aid, the pushing aid extrudes the elastic limiting component under the action of the external force so that the elastic limiting component may be separated from the limiting slot, and at the same time, the male seat or the female seat is rotated so that the clamping protrusions may be rotated to be separated from the clamping slots, thereby completing disassembly of the two components of the light device. The mode of adopting the male seat and the female seat to realize the detachable connection, on one hand, is beneficial to improving the connection reliability of the light device, and on the other hand, helps the light device to be accurately positioned during installation.

Among them, the meanings of the reference signs are as follows:

10. Clamping structure; 1. Male seat; 11. Clamping protrusion; 12. Second through hole; 13. Threaded stud; 2. Elastic limiting component; 21. Ejector pin; 22. First elastic member; 3. Female seat; 31. Clamping slot; 32. Limiting slot; 33. First through hole; 34. Bevel; 35. Second elastic member; 351. Avoiding notch; 36. Boss; 4. Pushing aid; 41. Elastic part; 42, Ejector pin part; 20. Lamp body; 30. Battery.

DETAILED DESCRIPTION OF ILLUSTRATED EMBODIMENTS

For a better understanding and implementation, the technical solutions of embodiments of the present invention will be clearly and completely described below with reference to the accompanying drawings of the embodiments of the present invention.

In the description of the present invention, it should be noted that the orientation or positional relationship indicated by the terms "upper", "lower", "front", "rear", "left", "right", "vertical", "horizontal", "top", "bottom", "inner", "outer", etc. is based on the orientation or positional relationship shown in the drawings, merely to facilitate the description of the present invention and simplify the description, and does not indicate or imply that apparatus or elements referred to must have a particular orientation, be constructed and operated in a particular orientation, and thus should not be construed as limiting the present invention.

Unless otherwise defined, all technical and scientific terms used herein have the same meaning as commonly understood by one of ordinary skilled in the art to which the present invention belongs. The terminologies used in the description of the present invention herein are for the purpose of describing particular embodiments only and are not intended to be limiting of the present invention.

Example 1

Figure 1:
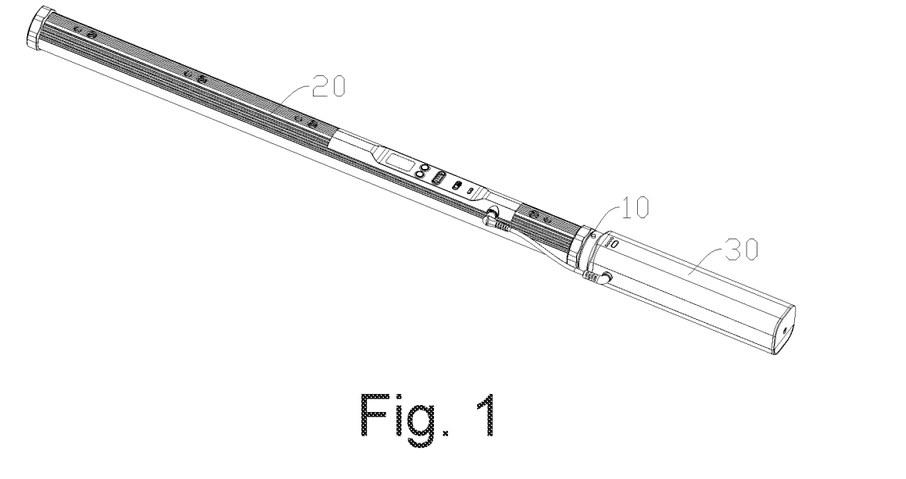
FIG. 1 is a schematic structural diagram of a light device according to an embodiment of the present invention.
Figure 2:
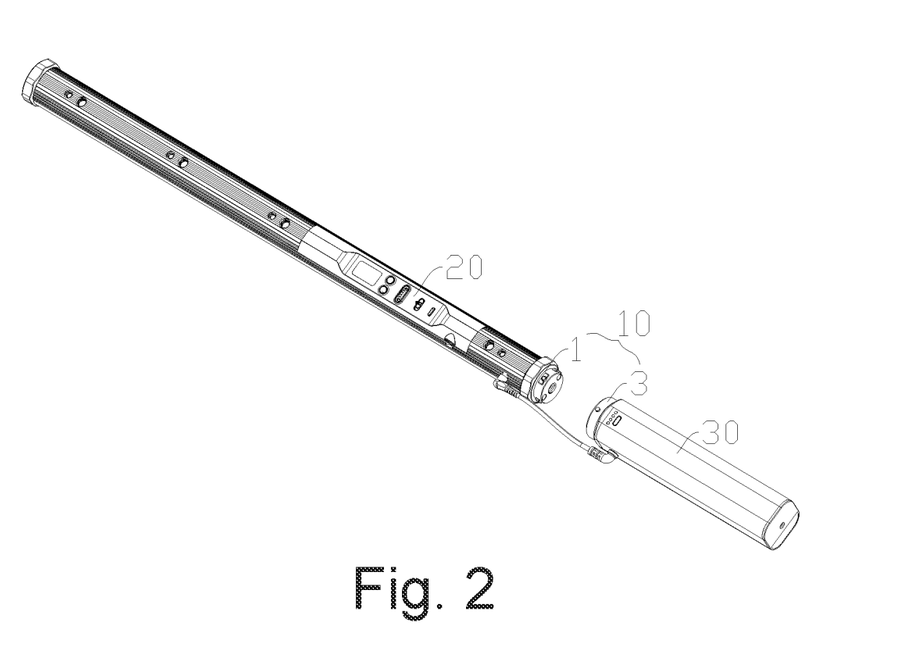
FIG. 2 is an exploded schematic structural diagram of a light device according to an embodiment of the present invention.
Figure 3:
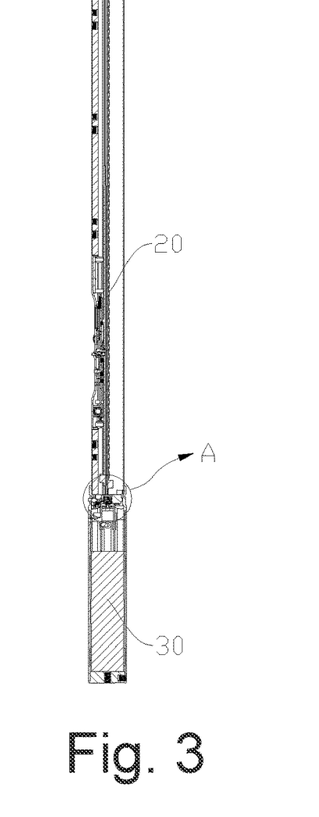
FIG. 3 is a section view of a light device according to an embodiment of the present invention.
Figure 4:
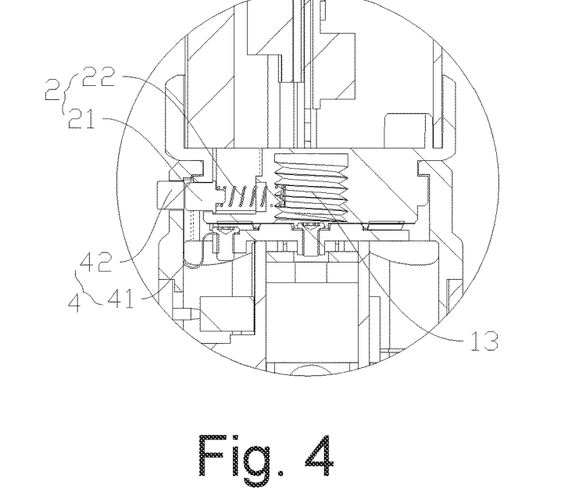
FIG. 4 is an enlarged schematic diagram of a position A in FIG. 3.
Figure 5:
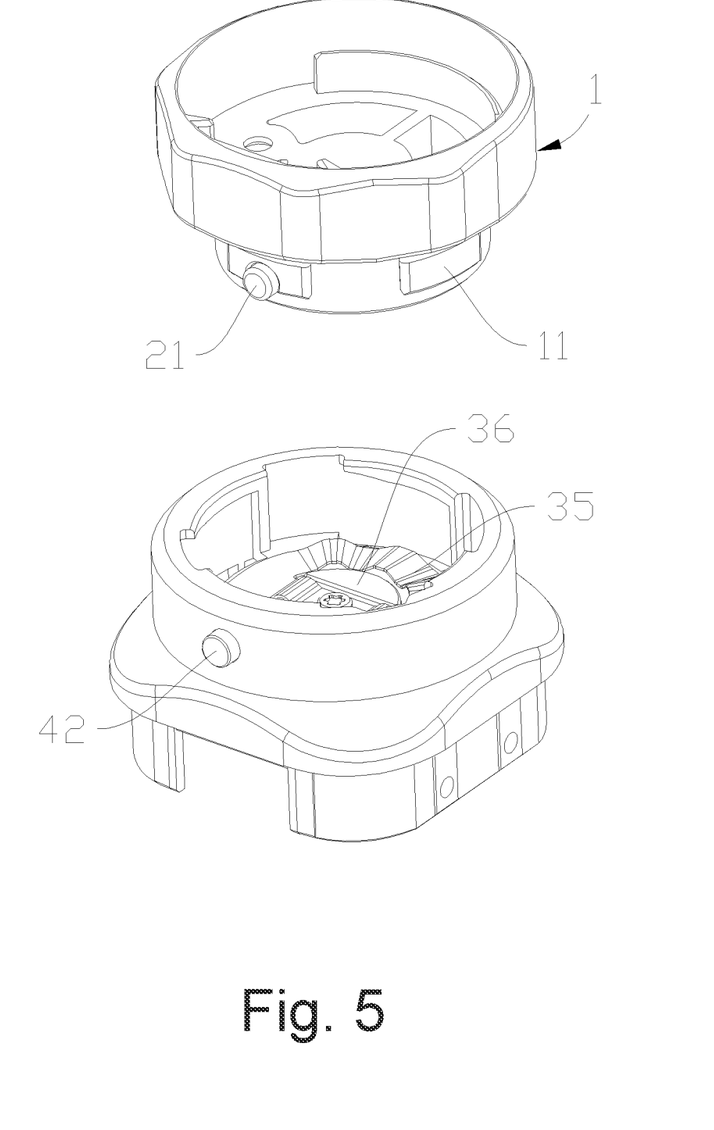
FIG. 5 is a partially exploded schematic structural diagram of a clamping structure according to an embodiment of the present invention.
Figure 6:
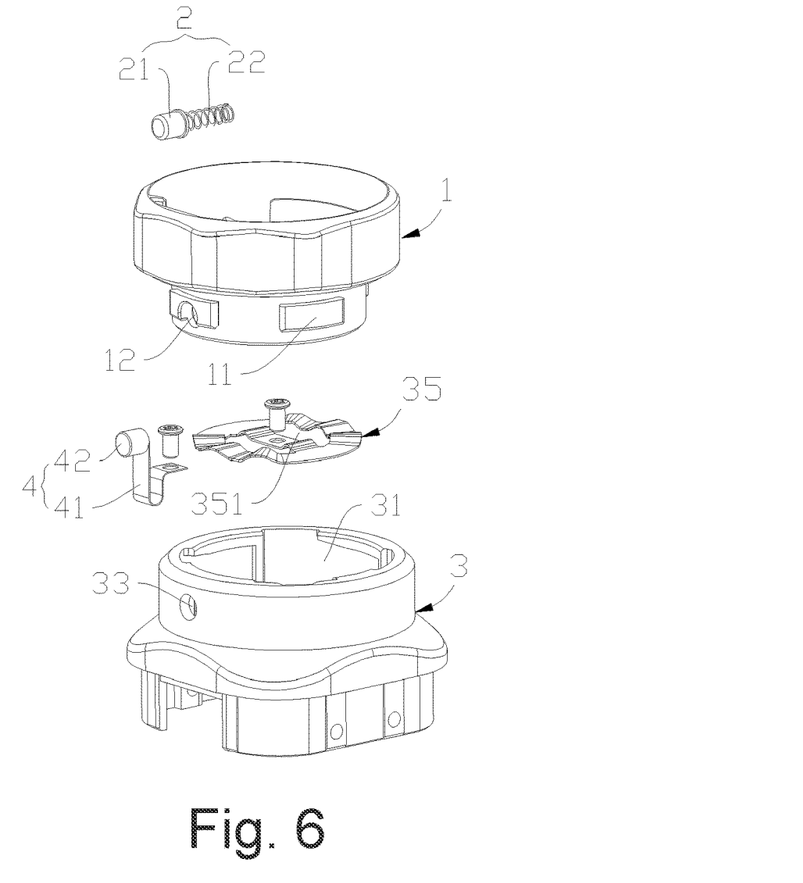
FIG. 6 is an exploded schematic structural diagram of a clamping structure according to an embodiment of the present invention.
Figure 7:
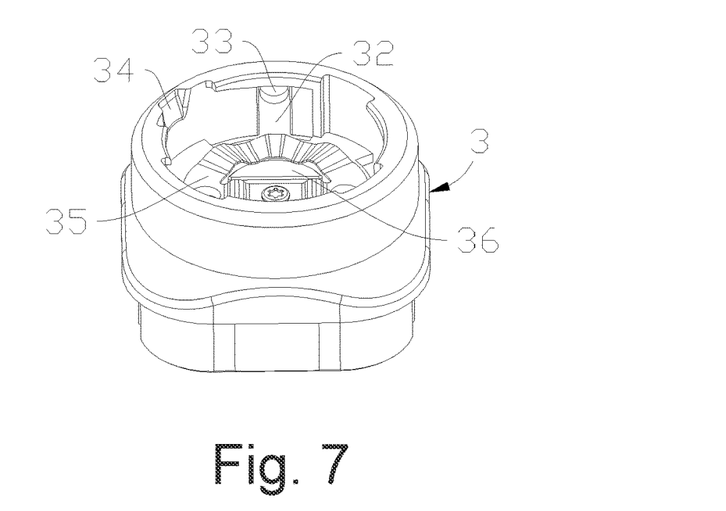
FIG. 7 is a schematic structural diagram of a partial structure of an embodiment of the present invention.

Please refer to FIGS. 1 and 2, Example 1 of the present invention discloses a light device, including a lamp body 20, a battery 30, and a clamping structure 10. The battery 30 is detachably connected to the lamp body 20 through the clamping structure 10.

The specific structure of the clamping structure 10 will be described in detail below.

Please refer to FIGS. 3-7 together, the clamping structure 10 of this solution includes a male seat 1, an elastic limiting component 2, a female seat 3, and a pushing aid 4. The male seat 1 is provided with clamping protrusions 11. The elastic limiting component 2 is disposed on the male seat 1. The female seat 3 is provided with clamping slots 31. One of the clamping slots 31 is internally provided with a limiting slot 32. The female seat 3 is further provided with a first through hole 33 penetrating to the limiting slot 32. The pushing aid 4 movably penetrates through the first through hole 33, and the pushing aid 4 is configured to make the elastic limiting component 2 clamped into or separated from the limiting slot 32.

As one optional implementation, the male seat 1 is disposed on the lamp body 20, and the female seat 3 is disposed on the battery 30. As another optional implementation, the female seat 3 is disposed on the lamp body 20, and the male seat 1 is disposed on the battery 30. In this embodiment, the situation that the male seat 1 is disposed on the lamp body 20, and the female seat 3 is disposed on the battery 30 is taken as an example.

In the light device of this solution, during butt joint operation of the battery 30 and the lamp body 20, the male seat 1 is screwed into the female seat 3 at a specific angle, the clamping protrusions 11 are rotated and buckled to the clamping slots 31, and the pushing aid 4 is configured to move relative to the first through hole 33 under extrusion of the elastic limiting component 2 so that the elastic limiting component 2 may be clamped into the limiting slot 32 for limiting, thereby completing the installation limiting of the male seat 1 and the female seat 3, namely, completing butt joint of the lamp body 20 and the battery 30. During disassembly operation of the battery 30 and the lamp body 20, an external force is applied to the pushing aid 4, the pushing aid 4 is further configured to extrude the elastic limiting component 2 under the action of the external force so that the elastic limiting component 2 may be separated from the limiting slot 32, and at the same time, the male seat 1 or the female seat 3 is rotated so that the clamping protrusions 11 may be rotated to be separated from the clamping slots 31, that is, disassembly of the lamp body 20 and the battery 30 is completed. The mode of adopting the male seat 1 and the female seat 3 to realize detachable connection, on one hand, is beneficial to improving the connection reliability of the light device, and on the other hand, helps the light device to be accurately positioned during installation.

In some embodiments, the male seat 1 is internally provided with a threaded stud 13, and the male seat 1 is provided with a second through hole 12. The elastic limiting component 2 includes an ejector pin 21 and a first elastic member 22. The ejector pin 21 movably penetrates through the second through hole 12. One end of the first elastic member 22 abuts against the threaded stud 13, and the other end of the first elastic member 22 abuts against a side, away from the pushing aid 4, of the ejector pin 21. In this way, when the clamping protrusions 11 are rotated and buckled to the clamping slots 31, the ejector pin 21 extrudes the pushing aid 4 under the action of the first elastic member 22 so that the pushing aid 4 may move relative to the first through hole 33, and thus the ejector pin 21 is clamped into the limiting slot 32. The pushing aid 4 abuts against the ejector pin 21 under the action of the external force, the ejector pin 21 extrudes the first elastic member 22, and thus the ejector pin 21 is separated from the limiting slot 32.

Exemplarily, the first elastic member 22 is a spring, while in other optional implementations, a second elastic member 35 may further be an elastic piece, which is not limited here.

In some embodiments, an inlet of one of the clamping slots 31 is provided with a bevel 34, and when the elastic limiting component 2 moves relative to the female seat 3, the elastic limiting component 2 is extruded or reset under the action of the bevel 34. In this way, in the process of installation and alignment of the male seat 1 and the female seat 3, the elastic limiting component 2 is changed into a compressed state under the extrusion of the bevel 34, that is, the elastic limiting component 2 is extruded into the compressed state before being clamped into the limiting slot 32, so that the elastic limiting component 2 has elastic force for extruding the pushing aid 4 when clamped into the limiting slot 32. In the disassembly process of the male seat 1 and the female seat 3, since the elastic limiting component 2 is in a compressed state when separated from the limiting slot 32, the elastic limiting component 2 may be gradually reset under the action of the bevel 34. In addition, the arrangement of the bevel 34 also facilitates the installation and alignment of the male seat 1 and the female seat 3.

In some embodiments, as an optional implementation, the pushing aid 4 includes an elastic part 41 and an ejector pin part 42 connected to the elastic part 41, the elastic part 41 is fixed into the limiting slot 32, and the ejector pin part 42 penetrates through the first through hole 33 and is capable of expanding and contracting relative to the first through hole 33. With this design mode, a user may extrude the ejector pin part 42, the ejector pin part 42 drives the elastic part 41 to elastically deform under the action of external force, and the ejector pin part 42 contracts relative to the first through hole 33 so as to extrude the elastic limiting component 2, that is, when the light device is disassembled, the external force borne by the pushing aid 4 is extrusion force.

As another optional implementation, the pushing aid 4 is a push button (not shown), the push button is slidably disposed at the first through hole 33, and a side, facing the elastic limiting component 2, of the push button is provided with a guide surface. The guide surface may be a wedge-shaped surface or a bevel disposed obliquely toward the elastic limiting component 2 so that the push button may extrude the elastic limiting component 2 when sliding relative to the first through hole 33, which is not limited here. With this design method, the user may push the push button, and the push button slides relative to the first through hole 33 under the action of external force so that the guide surface may extrude the elastic limiting component 2, that is, when the light device is disassembled, the external force borne by the pushing aid 4 is pushing force.

In this embodiment, the pushing aid 4 being a spring pin is taken as an example.

In some embodiments, the clamping protrusions 11 are disposed on the outer side of the male seat 1, the clamping slots 31 are disposed in the inner side of the female seat 3, and the male seat 1 is screwed to the inner side of the female seat 3 at a specific angle so that the clamping protrusions 11 on the outer side of the male seat 1 may be rotated and buckled to the clamping slots 31 located in the inner side of the female seat 3.

Further, there are a plurality of clamping protrusions 11 and a plurality of clamping slots 31. In this way, the female seat 3 and the male seat 1 may have a better positioning and installation effect. Exemplarily, there are four clamping protrusions 11, the four clamping protrusions 11 are disposed on the male seat 1 at intervals, there are also four clamping slots 31, and the four clamping slots 31 are disposed in the female seat 3 at intervals.

Furthermore, there are one group of elastic limiting component 2 and one group of pushing aid 4. There is one limiting slot 32 and one first through hole 33, and the limiting slot 32 and the first through hole 33 are formed in any clamping slot 31. There is also one bevel 34, and the bevel 34 is disposed on the same clamping slot 31 as the limiting slot 32. It can be understood that in other preferred implementations, there may further be a plurality of groups of elastic limiting components 2 and a plurality of groups of pushing aids 4, when there are the plurality of groups of elastic limiting components 2 and the plurality of groups of pushing aids 4, there are also a plurality of limiting slots 32, a plurality of first through holes 33 and a plurality of bevels 34 correspondingly, which is not limited here.

Optionally, the first through hole 33 is disposed in one clamping slot 31, and the second through hole 12 is disposed in the clamping protrusion 11 corresponding to the clamping slot 31.

In some embodiments, the male seat 1 and/or the female seat 3 are/is further provided with the second elastic member 35, and the second elastic member 35 is located between the male seat 1 and the female seat 3, and is configured to eliminate an axial gap between the male seat 1 and the female seat 3, that is, the second elastic member 35 is configured to provide elastic force when the clamping protrusions 11 are rotated and buckled to the clamping slots 31 so as to eliminate the axial gap between the male seat 1 and the female seat 3, thereby eliminating a gap between the lamp body 20 and the battery 30. In this way, the battery 30 and the lamp body 20 may be prevented from shaking.

The male seat 1 and/or the female seat 3 being provided with the second elastic member 35 specifically includes the following three situations: the male seat 1 is provided with the second elastic member 35, the female seat 3 is provided with the second elastic member 35, and the male seat 1 and the female seat 3 are each provided with the second elastic member 35. In this embodiment, the female seat 3 being provided with the second elastic member 35 is taken as an example.

Further, the male seat 1 and/or the female seat 3 are/is further provided with bosses 36, and the height of the highest point of each boss 36 is lower than the height of the highest point of the second elastic member 35. In this way, the bosses 36 may be configured to reduce fit clearance between the female seat 3 and the male seat 1, and meanwhile, an installation position and a compression space of the second elastic member 35 are reserved, thereby preventing the second elastic member 35 from failing beyond the elastic limit. It can be seen from the above that the second elastic member 35 is disposed on the female seat 3, and correspondingly, the bosses 36 are also disposed on the female seat 3.

Specifically, there are two bosses 36, and the two bosses 36 are spaced apart on the bottom surface of the inner side of the female seat 3. The second elastic member 35 is the elastic piece, and the second elastic member 35 is also disposed on the bottom surface of the inner side of the female seat 3. Two avoiding notches 351 are disposed at positions, corresponding to the two bosses, of the second elastic member 35, and the two bosses 36 penetrate through the two avoiding notches 351 respectively.

In some embodiments, the elastic limiting component 2 and the pushing aid 4 are both metal members or plastic members. In this way, since the elastic limiting component 2 and the pushing aid 4 are both metal members or plastic members, the elastic limiting component 2 abuts against the pushing aid 4 when clamped into the limiting slot 32 so that the elastic limiting component 2 and the pushing aid 4 may collide and generate a prompt sound, and the prompt sound may bring convenience to the user to determine whether the lamp body 20 and the battery 30 are in butt joint in place.

The following is a detailed description of the disassembly and assembly processes of the battery 30 and the lamp body 20:

The butt joint operation of the battery 30 and the lamp body 20: the male seat 1 is screwed into the female seat 3 at a specific angle, and the ejector pin 21 extrudes the first elastic member 22 under the action of the bevel 34 at the inlet of the corresponding clamping slot 31, so that the first elastic member 22 is in a compressed state, and when the male seat 1 rotates relative to the female seat 3 until the clamping protrusions 11 are rotated and buckled to the clamping slots 31, the ejector pin 21 is clamped into the limiting slot 32 under the action of the first elastic member 22 and extrudes the ejector pin part 42 of the spring pin, thereby completing installation limiting of the male seat 1 and the female seat 3, namely, completing the butt joint of the lamp body 20 and the battery 30.

The disassembly operation of the battery 30 and the lamp body 20: the extrusion force is applied to the ejector pin part 42 of the spring pin, the ejector pin part 42 of the spring pin extrudes the ejector pin 21 under the action of the extrusion force, and the ejector pin 21 extrudes the first elastic member 22, so that the ejector pin 21 is separated from the limiting slot 32, and at the same time, the male seat 1 or the female seat 3 is rotated so that the clamping protrusions 11 may be rotated to be separated from the clamping slots 31, thereby completing the disassembly of the male seat 1 and the female seat 3, namely, completing the disassembly of the lamp body 20 and the battery 30.

The light device of Example 1 of the present invention is provided with the clamping structure 10 including the male seat 1, the elastic limiting component 2, the female seat 3 and the pushing aid 4, the male seat 1 is provided with the clamping protrusions 11, the elastic limiting component 2 is disposed on the male seat 1, the female seat 3 is provided with the clamping slots 31, one of the clamping slots 31 is internally provided with the limiting slot 32, the female seat 3 is further provided with the first through hole 33 penetrating to the limiting slot 32, the pushing aid 4 movably penetrates through the first through hole 33, and the pushing aid 4 is configured to make the elastic limiting component 2 clamped into or separated from the limiting slot 32. In this way, during butt joint operation of the battery 30 and the lamp body 20, the male seat 1 is screwed into the female seat 3 at a specific angle, the clamping protrusions 11 are rotated and buckled to the clamping slots 31, and the pushing aid 4 is configured to move relative to the first through hole 33 under extrusion of the elastic limiting component 2 so that the elastic limiting component 2 may be clamped into the limiting slot 32 for limiting, thereby completing the installation limiting of the male seat 1 and the female seat 3, namely, completing butt joint of the lamp body 20 and the battery 30. During disassembly operation of the battery 30 and the lamp body 20, an external force is applied to the pushing aid 4, the pushing aid 4 is further configured to extrude the elastic limiting component 2 under the action of the external force so that the elastic limiting component 2 may be separated from the limiting slot 32, and at the same time, the male seat 1 or the female seat 3 is rotated so that the clamping protrusions 11 may be rotated to be separated from the clamping slots 31, that is, disassembly of the lamp body 20 and the battery 30 is completed. By adopting the male seat 1 and the female seat 3 to realize the detachable connection between the lamp body and the battery 30, on one hand, the connection is reliable, which is beneficial to improving the installation reliability of the battery 30 and the lamp body 20; and on the other hand, compared to a traditional threaded connection mode, fewer rotations are required for assembly and disassembly, which is beneficial to improving the efficiency of disassembly and assembly of the battery 30 and the lamp body 20.

Example 2

The present invention discloses a light device, including a lamp body, a handle, a battery and a clamping structure as in Example 1. The handle is detachably connected to the lamp body through the clamping structure, and the battery is disposed on the lamp body. As one optional implementation, a male seat is disposed on the lamp body, and a female seat is disposed on the handle. As another optional implementation, the female seat is disposed on the lamp body, and the male seat is disposed on the handle.

In addition, the specific structure of the clamping structure may refer to Example 1, which will not be repeated here.

The light device of Example 2 of the present invention is provided with the clamping structure including the male seat and the female seat, and detachable connection between the handle and the lamp body is realized through the clamping structure, which, on one hand, is beneficial to improving the connection reliability of the light device, and on the other hand, helps the light device to be accurately positioned when installed.

Example 3

The present invention discloses a light device, including a lamp body, a handle, a battery and a clamping structure as in Example 1. The handle is detachably connected to the lamp body through the clamping structure, and the battery is disposed on the handle.

As one optional implementation, a male seat is disposed on the lamp body, and a female seat is disposed on the handle. As another optional implementation, the female seat is disposed on the lamp body, and the male seat is disposed on the handle.

In addition, the specific structure of the clamping structure may refer to Example 1, which will not be repeated here.

The light device of Example 2 of the present invention is provided with the clamping structure including the male seat and the female seat, and detachable connection between the handle and the lamp body is realized through clamping structure, which, on one hand, is beneficial to improving the connection reliability of the light device, and on the other hand, helps the light device to be accurately positioned when installed.

The technical means disclosed in the solutions of the present invention are not limited to the technical means disclosed in the above-mentioned embodiments, but also include technical solutions composed of any combination of the above technical features. It should be noted that for those ordinary skilled in the art, without departing from the principle of the present invention, several improvements and modifications can be made, and these improvements and modifications are also considered to be within the scope of protection of the present invention.

The invention claimed is:

1. A clamping structure, applied to detachable connection of a light device, and characterized by comprising:
   a male seat, provided with clamping protrusions;
   an elastic limiting component, disposed on the male seat;
   a female seat, provided with clamping slots in clamping fit with the clamping protrusions, wherein one of the clamping slots is internally provided with a limiting slot, and the female seat is further provided with a first through hole penetrating to the limiting slot; and
   a pushing aid, movably penetrating through the first through hole; and
   the pushing aid is configured to make the elastic limiting component clamped into or separated from the limiting slot.

2. The clamping structure according to claim 1, characterized in that the male seat is internally provided with a threaded stud, the male seat is provided with a second through hole, and the elastic limiting component comprises an ejector pin and a first elastic member, the ejector pin movably penetrates through the second through hole, one end of the first elastic member abuts against the threaded stud, and another end of the first elastic member abuts against a side, away from the pushing aid, of the ejector pin.

3. The clamping structure according to claim 2, characterized in that an inlet of one of the clamping slots is provided with a bevel, and when the elastic limiting component moves relative to the female seat, the elastic limiting component is extruded or reset under an action of the bevel.

4. The clamping structure according to claim 1, characterized in that the pushing aid comprises an elastic part and an ejector pin part connected to the elastic part, the elastic part is fixed into the limiting slot, the ejector pin part penetrates through the first through hole and is capable of expanding and contracting relative to the first through hole.

5. The clamping structure according to claim 1, characterized in that the pushing aid is a push button, the push button is slidably disposed at the first through hole, and a side, facing the elastic limiting component, of the push button is provided with a guide surface.

6. The clamping structure according to claim 1, characterized in that the male seat and/or the female seat are/is further provided with a second elastic member, and the second elastic member is located between the male seat and the female seat, and configured to eliminate an axial gap between the male seat and the female seat.

7. The clamping structure according to claim 6, characterized in that the male seat and/or the female seat are/is further provided with bosses, and a height of a highest point of each boss is lower than a height of a highest point of the second elastic member.

8. A light device, characterized by comprising a lamp body, a battery, and the clamping structure according to claim 1, wherein the battery is detachably connected to the lamp body through the clamping structure.

9. A light device, characterized by comprising a lamp body, a handle, a battery, and the clamping structure according to claim 1, wherein the handle is detachably connected to the lamp body through the clamping structure, and the battery is disposed on the lamp body.

10. A light device, characterized by comprising a lamp body, a handle, a battery, and the clamping structure according to claim 1, wherein the handle is detachably connected to the lamp body through the clamping structure, and the battery is disposed on the handle.

* * * * *